(12) United States Patent
Faruque et al.

(10) Patent No.: US 9,481,316 B2
(45) Date of Patent: Nov. 1, 2016

(54) HIDDEN STORAGE BOX AND MULTI-PURPOSE UTILITY TABLE FOR LIGHT PICKUP TRUCKS

(71) Applicant: FORD GLOBAL TECHNOLOGIES, LLC, Dearborn, MI (US)

(72) Inventors: Mohammed Omar Faruque, Ann Arbor, MI (US); Dean M. Jaradi, Macomb, MI (US); Iskander Farooq, Novi, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 14/594,222

(22) Filed: Jan. 12, 2015

(65) Prior Publication Data

US 2016/0200260 A1    Jul. 14, 2016

(51) Int. Cl.
| | | |
|---|---|---|
| *B60J 7/00* | (2006.01) | |
| *B60R 9/06* | (2006.01) | |
| *B62D 33/027* | (2006.01) | |

(52) U.S. Cl.
CPC .............. *B60R 9/06* (2013.01); *B62D 33/027* (2013.01)

(58) Field of Classification Search
CPC ............ G11B 23/023; G11B 23/0233; G11B 23/0236; G11B 33/0433; G07B 15/066; G21C 19/07; A01K 97/06; A47F 7/146; B60R 9/00
USPC ........................ 296/187.08, 37.6, 37.5, 37.14
See application file for complete search history.

(56) References Cited

U.S. PATENT DOCUMENTS

| | | | | |
|---|---|---|---|---|
| 2,784,027 | A * | 3/1957 | Temp ........................ | B60P 3/32 224/404 |
| 4,472,639 | A * | 9/1984 | Bianchi .............. | B62D 33/0273 296/26.11 |
| 4,531,773 | A * | 7/1985 | Smith ................ | B62D 33/0273 224/403 |
| 4,596,417 | A * | 6/1986 | Bennett ................... | B60P 1/435 296/61 |
| 4,749,226 | A | 6/1988 | Heft | |
| 4,915,437 | A * | 4/1990 | Cherry .................... | B60R 11/06 108/44 |
| 5,468,038 | A * | 11/1995 | Sauri ...................... | B62D 33/08 296/26.1 |
| 5,755,480 | A * | 5/1998 | Bryan ................ | B62D 33/0273 224/403 |

(Continued)

*Primary Examiner* — Kiran B Patel
(74) *Attorney, Agent, or Firm* — Jason Rogers; King & Schickli PLLC (57) ABSTRACT

A storage box system for a motor vehicle includes a folding storage box and a sliding rail assembly for translating the folding storage box between a hidden storage position below a cargo bay of the motor vehicle and a deployed position extending from a rear portion of the motor vehicle. The storage box includes at least a back and opposed sides being connected to a floor for transitioning between a folded configuration and an unfolded configuration. Structures are provided for retaining the opposed sides and back in a substantially perpendicular orientation relative to a plane defined by the floor when the folding storage box is in the unfolded configuration. The sliding rail assembly includes one or more sliding rails associated with the folding storage box floor and one or more cooperating sleeves disposed below the cargo bay for slidingly receiving the sliding rails therein.

16 Claims, 6 Drawing Sheets

(56) References Cited

U.S. PATENT DOCUMENTS

| | | | | |
|---|---|---|---|---|
| 5,765,892 A * | 6/1998 | Covington | B62D 33/0273 | 296/26.03 |
| 5,775,759 A * | 7/1998 | Cummins | B62D 33/0273 | 296/26.11 |
| 5,816,638 A * | 10/1998 | Pool, III | B62D 33/0273 | 296/26.11 |
| 5,820,188 A * | 10/1998 | Nash | B62D 33/0273 | 296/26.11 |
| 5,823,596 A * | 10/1998 | Kulesza | B60P 3/40 | 296/26.01 |
| 5,853,116 A | 12/1998 | Schreiner | | |
| 5,902,000 A * | 5/1999 | Wold | B62D 33/0273 | 296/26.11 |
| 5,996,868 A * | 12/1999 | Paradis | B60R 9/00 | 224/404 |
| 5,997,066 A * | 12/1999 | Scott | B62D 33/0273 | 296/26.08 |
| 6,007,127 A * | 12/1999 | Garofalo | B62D 33/0273 | 296/26.11 |
| 6,155,622 A * | 12/2000 | Reed | B62D 33/0273 | 296/26.08 |
| 6,254,162 B1 | 7/2001 | Faber et al. | | |
| 6,257,640 B1 * | 7/2001 | Leitner | B60R 9/00 | 224/404 |
| 6,322,125 B2 * | 11/2001 | Bauer | 296/26.1 | |
| 6,412,847 B2 * | 7/2002 | De Gaillard | B62D 33/0276 | 296/100.09 |
| 6,507,701 B2 | 1/2003 | Lake | | |
| 6,536,826 B1 | 3/2003 | Reed | | |
| 6,659,524 B1 * | 12/2003 | Carlson | B60P 1/003 | 296/26.09 |
| D485,800 S * | 1/2004 | Smith | D12/414 | |
| 6,742,979 B1 * | 6/2004 | Salazar | B60R 9/02 | 296/37.6 |
| 6,948,755 B1 * | 9/2005 | Bauer | B60P 1/435 | 296/37.6 |
| 6,986,541 B1 | 1/2006 | Haack | | |
| 7,175,218 B1 * | 2/2007 | Keene | B60P 3/40 | 296/26.08 |
| 7,182,380 B2 * | 2/2007 | Nagle | B62D 33/0273 | 296/26.11 |
| 7,226,100 B1 * | 6/2007 | Willey | B62D 33/0273 | 296/26.11 |
| 7,543,872 B1 * | 6/2009 | Burns | B60P 1/003 | 296/26.08 |
| 7,631,919 B2 * | 12/2009 | Schrader | B62D 33/0273 | 296/37.14 |
| 8,109,552 B2 * | 2/2012 | Nelson | B62D 33/0273 | 224/403 |
| 8,757,694 B1 * | 6/2014 | Kuhnle | B62D 33/03 | 296/26.08 |
| 9,108,687 B2 * | 8/2015 | Lepage | B60P 3/40 | |
| 2006/0214449 A1 * | 9/2006 | Klusmeier | B62D 33/0273 | 296/26.11 |
| 2007/0210599 A1 * | 9/2007 | Arnold | B60P 1/003 | 296/26.09 |
| 2008/0185862 A1 | 8/2008 | Tarrant et al. | | |
| 2008/0231067 A1 * | 9/2008 | Nagle | B60P 3/07 | 296/50 |
| 2009/0255967 A1 | 10/2009 | Leuder | | |
| 2010/0264180 A1 | 10/2010 | Allotey | | |
| 2012/0261938 A1 * | 10/2012 | Roach | B60P 7/0892 | 296/39.2 |
| 2014/0326764 A1 * | 11/2014 | Roach | B60P 7/0892 | 224/404 |

* cited by examiner

HIDDEN STORAGE BOX AND MULTI-PURPOSE UTILITY TABLE FOR LIGHT PICKUP TRUCKS

TECHNICAL FIELD

This disclosure relates generally to storage boxes for use with motor vehicles. In particular, the disclosure relates to a hidden storage box/utility table for use in a motor vehicle such as a light pickup truck or sport-utility vehicle (SUV). The described storage box provides supplemental storage space without occupying existing cargo space in the vehicle.

BACKGROUND

It is known to provide storage boxes dimensioned to fit within the bed of a motor vehicle such as a pickup truck. Such boxes are typically dimensioned to fit across a longitudinal dimension of the pickup truck. While convenient, conventional truck storage boxes utilize a significant portion of the available cargo space of a pickup truck bed. Further, because conventional storage boxes are placed in the pickup truck bed, it can be difficult for a user to retrieve items stored in the boxes from the ground. Instead, the user may have to climb up into the truck bed to retrieve desired items.

To solve this and other problems, the present disclosure describes a hidden storage box for a pickup truck or other motor vehicle. Advantageously, when not in use the storage box is stored in a collapsed configuration under the motor vehicle bed. In use, the storage box is deployed at a rear of the motor vehicle. Thus, whether stored or deployed for use, the hidden storage box of the present disclosure does not occupy any existing cargo space of the vehicle, for example of the bed of a pickup truck, the rear cargo compartment of an SUV, and the like. Still more, when deployed the storage box of the disclosure may be used as a table or other work surface, further enhancing user convenience and versatility of the described device.

SUMMARY

In accordance with the purposes and benefits described herein, a hidden storage box/utility table for a motor vehicle is described. In one aspect, a storage box system for a motor vehicle is provided, including a folding storage box and a sliding rail assembly for translating the folding storage box between a hidden storage position below a cargo bay of the motor vehicle and a deployed position extending from a rear portion of the motor vehicle. The storage box includes at least a back, opposed sides, and a floor, the back and opposed sides being hingedly connected to the floor for transitioning between a folded configuration and an unfolded configuration. Structures such as locking hinges are provided for retaining the opposed sides and back in a substantially perpendicular orientation relative to a plane defined by the floor when the folding storage box is in the unfolded configuration. The sliding rail assembly includes one or more sliding rails associated with the folding storage box floor and one or more cooperating sleeves disposed below the cargo bay for slidingly receiving the sliding rails therein. The one or more cooperating sleeves may be associated with a portion of a frame of the motor vehicle disposed below the cargo bay.

In another aspect, a storage box system for a motor vehicle includes a folding storage box displaceable from a hidden storage position wherein the folding storage box is in a contracted configuration below a cargo bay of the motor vehicle end and a deployed position wherein the folding storage box is in an erected configuration forming a storage box outboard of the cargo bay. The cargo bay may be accessed by means of a tailgate. In the erected configuration, the folding storage box is disposed adjacent to the tailgate.

In yet other aspects, methods for providing supplemental storage for a motor vehicle and motor vehicles including supplemental storage in the form of the disclosed folding storage box are described.

In the following description, there are shown and described embodiments of the disclosed hidden storage box/utility table for a motor vehicle. As it should be realized, the hidden storage box/utility table is capable of other, different embodiments and its several details are capable of modification in various, obvious aspects all without departing from the device as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed hidden storage box/utility table, and together with the description serve to explain certain principles thereof. In the drawing.

Reference will now be made in detail to embodiments of the disclosed hidden storage box/utility table, examples of which are illustrated in the accompanying drawing figures.

DETAILED DESCRIPTION

Figure 1:
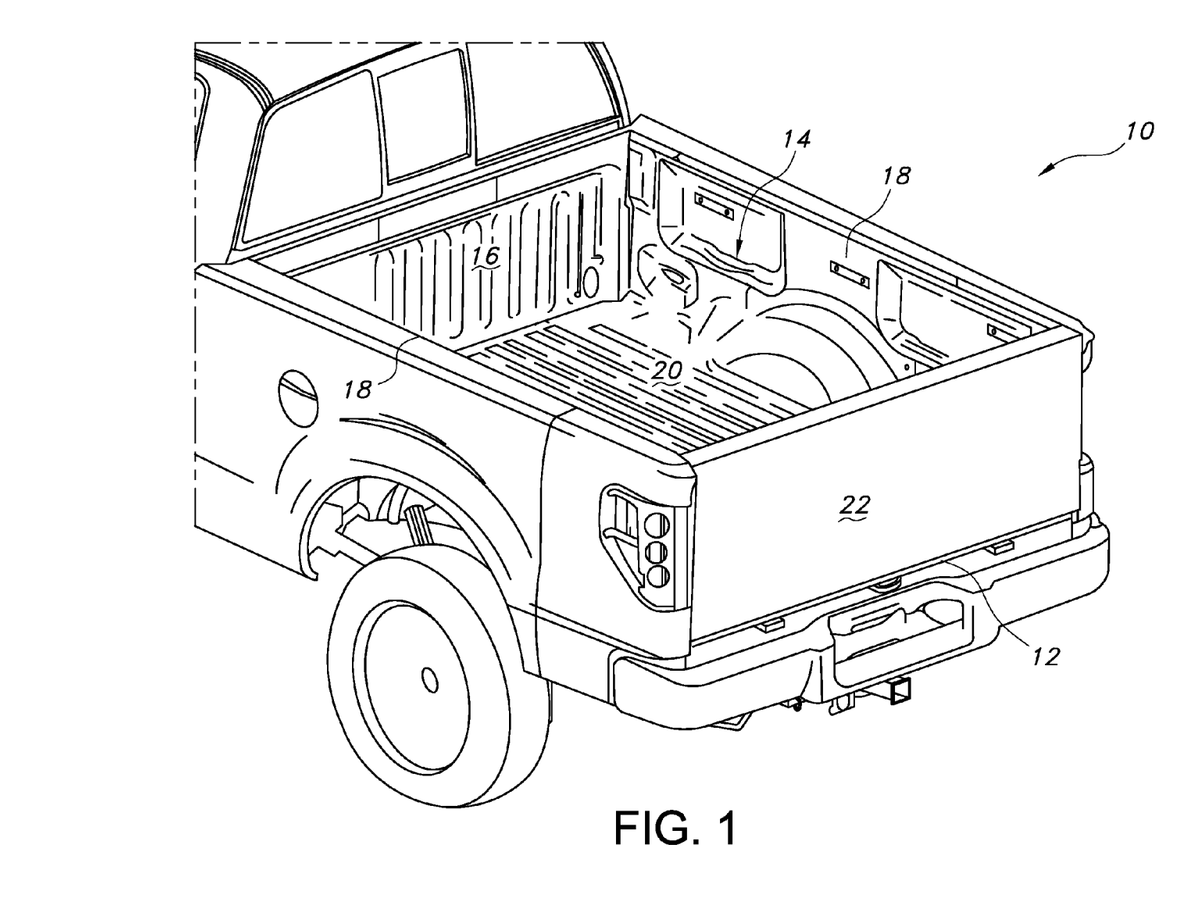
FIG. 1 depicts a motor vehicle including a storage box/utility table according to the present disclosure in a hidden and stored configuration.

Reference is now made to FIG. 1 illustrating a motor vehicle 10 including a hidden storage box 12 according to the present disclosure. The depicted motor vehicle 10 is a pickup truck including a cargo area 14 defined by a front wall 16, two opposed sidewalls 18, a floor 20, and a tailgate 22. However, it will be appreciated that the hidden storage box 12 of the present disclosure can be included in any motor vehicle including a cargo area, such as a sport-utility vehicle, a hatchback, etc. Advantageously, the hidden storage box 12, when placed in a hidden storage position (see FIG. 2), is disposed below the floor 20 of the cargo area 14. Thus, available storage/cargo volume of cargo area 14 is not occupied by the hidden storage box 12.

Figure 2:
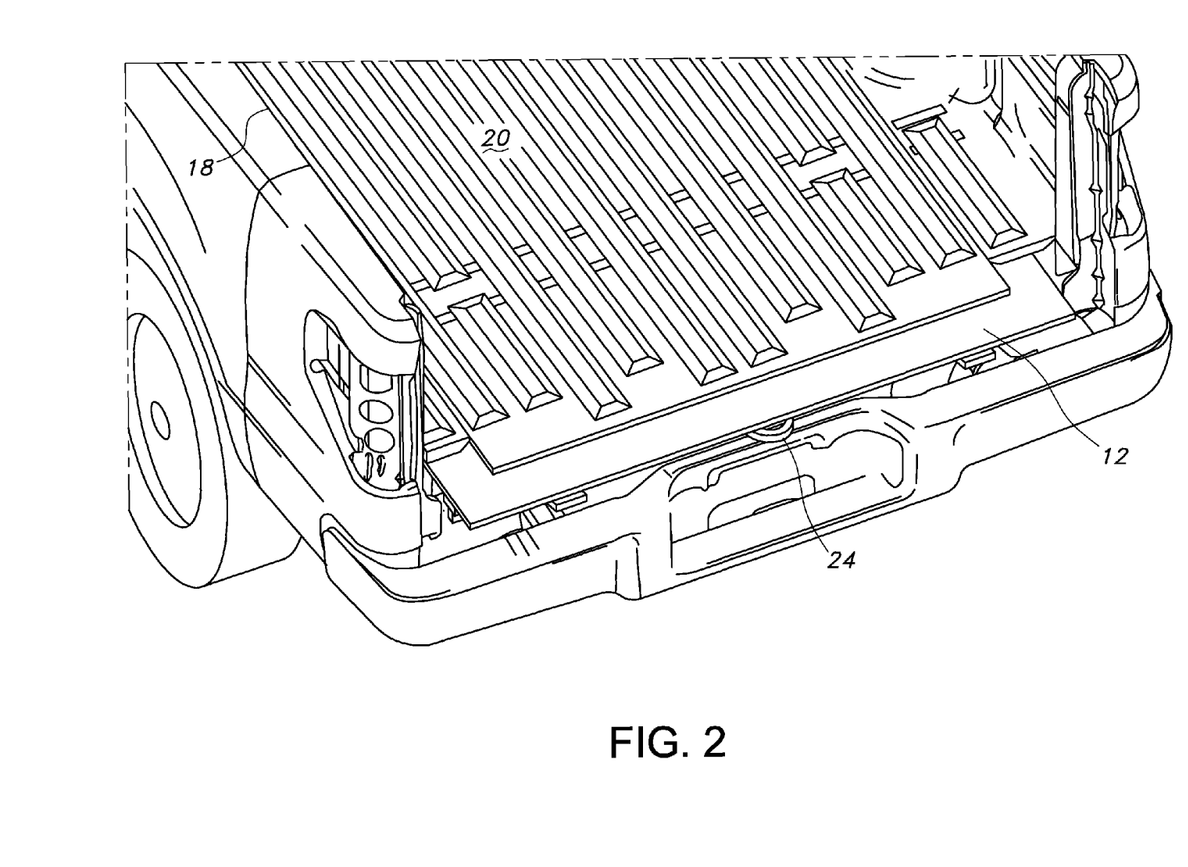
FIG. 2 shows a closer view of the storage box/utility table of FIG. 1.
Figure 3:
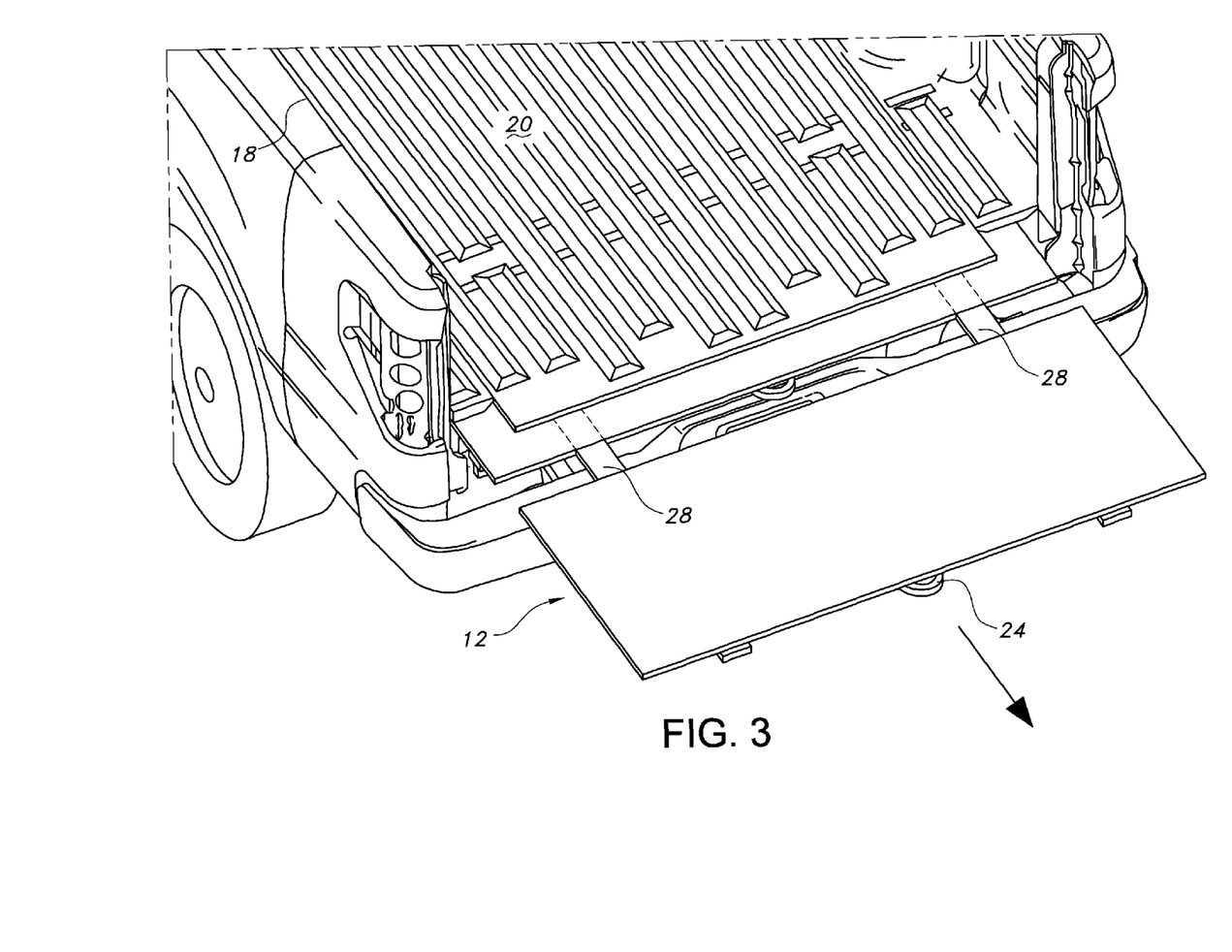
FIG. 3 shows the storage box/utility table of FIG. 2, translated from under the bed of the motor vehicle.

A handle 24 is provided to allow a user to translate the hidden storage box 12 between the hidden storage position (FIG. 2) and a deployed position (FIG. 3; see arrow). In the depicted embodiment, the handle 24 includes a latching mechanism comprising a removable pin (not shown) for preventing inadvertent deployment of the hidden storage box 12. However, alternative locking/latching mechanisms are known in the art and contemplated for use herein. For example, a push-pull lock (not shown) of a type well known in the art may be provided at an opposed end of the hidden storage box 12 relative to handle 24. As is known, the user then need only push on handle 24 to release the push-pull lock and pull the device out to the deployed position. The user then need only push the device back to the hidden storage position to re-engage the push-pull lock. Alternatively, handle 24 may be associated with a latching mechanism similar to that found in cabinetry for latching cabinet doors, whereby the user simply pulls or rotates handle 24 to disengage a latch from a latch plate (not shown) and then pulls hidden storage box 12 to the deployed position. Still more, locking/latching mechanisms associated with a sliding rail assembly (see discussion infra) are known in the art. Any such latching mechanisms and other latching/locking mechanisms may be suitable, and are contemplated for use herein.

Figure 6:
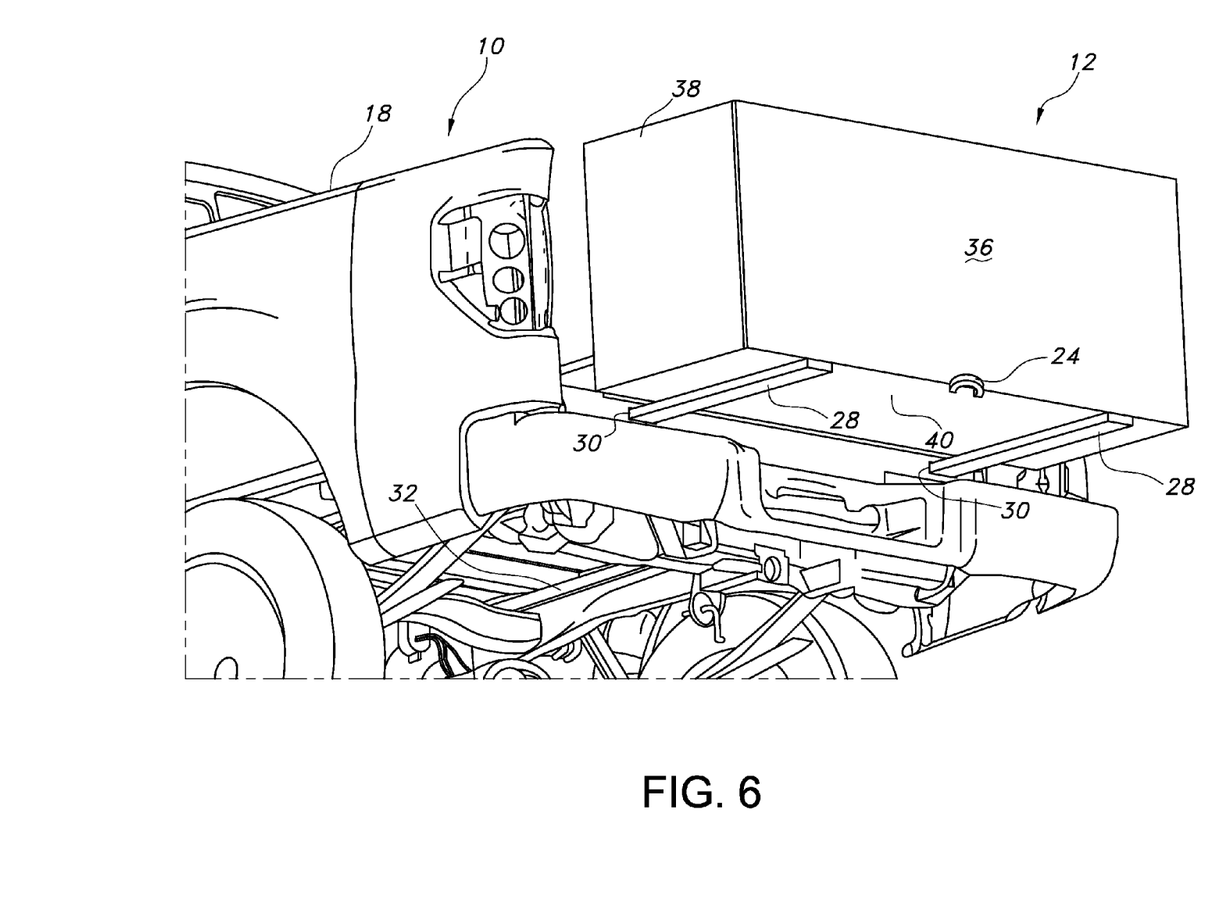
FIG. 6 shows a motor vehicle body frame including sliding support tracks for the storage box/utility table of the present disclosure.

A sliding rail assembly 26 allows translating the hidden storage box 12 between the storage position and the deployed positions. One or more sliding rails 28 are secured to and support the hidden storage box 12 (see FIG. 4A). In the depicted embodiment two sliding rails 28 are provided, although it will be appreciated that in accordance with the dimensions and/or weight of the hidden storage box 12, more or fewer sliding rails 28 may be provided. The sliding rails 28 are slidingly received in cooperating sleeves 30 disposed below the cargo area 14 floor 20 (see FIG. 6). In the depicted embodiment, cooperating sleeves 30 are associated with a portion of the motor vehicle 10 frame 32 that is disposed below cargo area 14 (see FIG. 6).

In the depicted embodiment, the sliding rail assembly 26 is an under-mount drawer slide-type mechanism of a type well known in the art, including under-mounted sliding rails 28 attached to the hidden storage box 12, and cooperating sleeves 30 disposed below cargo area 14. Each cooperating sleeve 30 includes bearings or rollers (not shown) to ensure smooth operation. However, it will be appreciated that alternatives can be readily implemented. For example, side-mounted rails (not shown), a center-mounted rail (not shown), and others are contemplated. As another alternative, the rollers/bearings may be associated with rails 28 rather than with cooperating sleeves 30. As is also known, such mechanisms may include stops and/or hold-in mechanisms (not shown) to retain the hidden storage box 12 in the hidden storage position or the deployed position as desired, and/or to prevent inadvertent full removal of hidden storage box 12 from cooperating sleeves 30. Such mechanisms are well known to the skilled artisan, for example in the cabinetry and/or drawer slide arts, and require no further description herein.

Figure 4A:
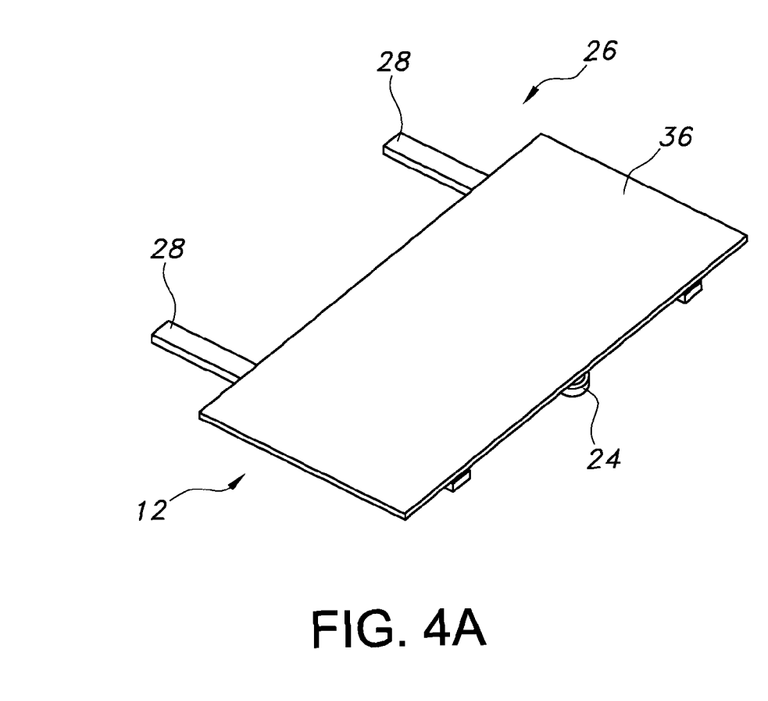
FIG. 4A shows the storage box/utility table of FIG. 3 in isolation.
Figure 4B:
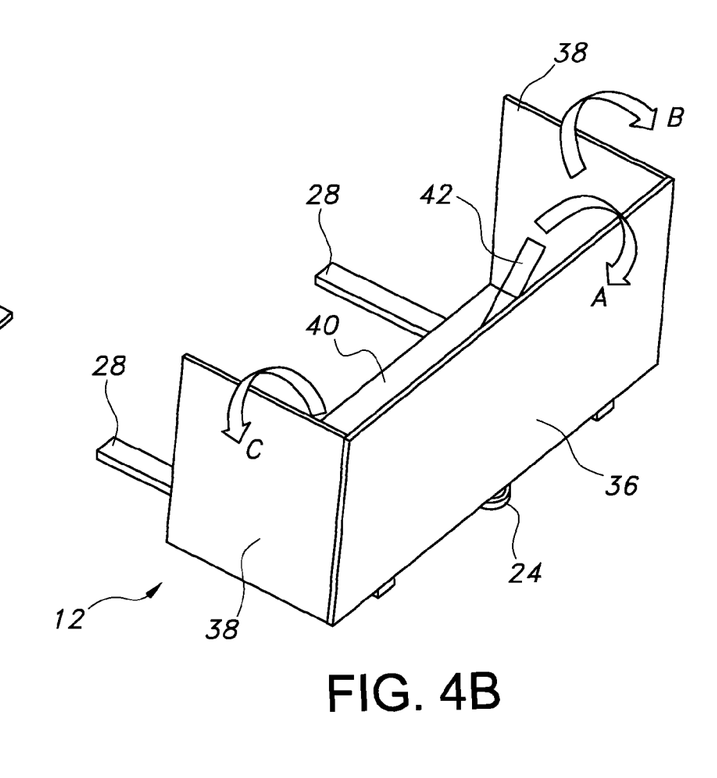
FIG. 4B shows the storage box/utility table of FIG. 4A, deployed to the opened configuration.
Figure 5:
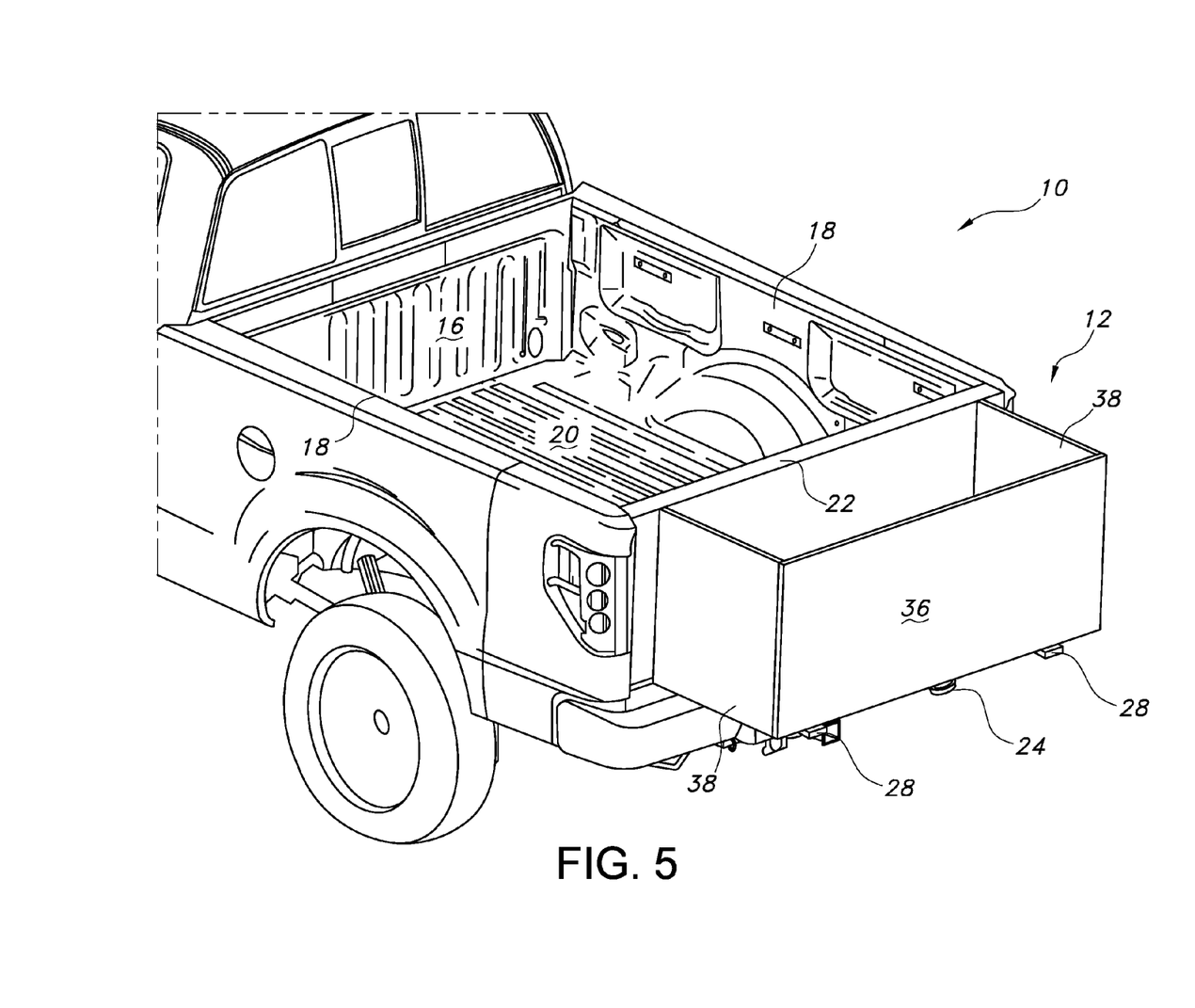
FIG. 5 shows the deployed storage box/utility table of FIG. 4B associated with a rear portion of the motor vehicle of FIG. 1.

As shown in FIGS. 3 and 4A, a panel defining the back 36 of the hidden storage box 12 in the deployed position defines a substantially planar top surface disposed at a rear of the motor vehicle 10. It will be appreciated that in this deployed but folded configuration the hidden storage box 12 can be readily used as a utility table or work surface, adding to the convenience to the user. The hidden storage box 12 further includes opposed panels defining opposed sides 38 (See FIG. 4B). Back 36 and opposed sides 38 are hingedly connected to a floor 40 that is supported by sliding rails 28 (see FIGS. 4B and 6). By unfolding back 36 and opposed sides 38 (see arrows A, B, C of FIG. 4B) a storage box 12 partial structure is defined.

In the depicted embodiment, when the hidden storage box 12 is in the deployed and unfolded configuration, the motor vehicle 10 tailgate 22 provides a fourth side for hidden storage box 12, completing the box structure. In embodiments, after the hidden storage box 12 is in the deployed and unfolded configuration, it can be translated towards the motor vehicle 10 slightly so that the tailgate 22 serves as a fourth wall of the hidden storage box 12. The hidden storage box 12 can then be secured by a pin or similar device (not shown) to one or both of the sliding rails 28 by engaging the pin to a hole or slot (not shown) in the sliding rail 28. In an alternative embodiment, one or both of the sliding rail(s) 28 may include a spring-loaded pin (not shown) which engages a cooperating aperture or slot (not shown) in the hidden storage box 12 when the hidden storage box 12 is translated slightly towards the tailgate 22 to line up the hole with the pin in the sliding rail 28. In these embodiments, at least the edges of opposed sides 38 may be covered, lined, or coated with a suitable protective material (not shown) to prevent cosmetic or other damage to the tailgate 22. Example materials could include rubber, plastics, other protective polymers, and the like.

It will be appreciated that in alternative embodiments, an additional hinged panel (not shown) may be provided to define that fourth hidden storage box 12 side. Still more, yet another panel (not shown) hingedly connected to back 36 or to one of opposed sides 28 may be included to provide a top (not shown) for the unfolded storage box 12. As still yet another alternative embodiment, a flexible "shade-type" cover may be provided for the storage box 12, which deploys from back 36 or one of opposed sides 38. The caveat is that the entire box structure must be capable of folding to a substantially planar configuration as shown in FIG. 4A for storage as shown in FIGS. 1 and 2.

In the depicted embodiments, opposed sides 38 and back 36 each include locking hinges 42 of a type well known in the art, which retain the back and sides in the needed substantially vertical configuration relative to the horizontal floor 40 to define the unfolded box structure (that is, opposed sides 38 and back 36 are held in a substantially perpendicular orientation to a plane defined by floor 40). In alternative embodiments, additional or alternative structures for preserving contact between the edges of opposed sides 38 and back 36 and/or for retaining a substantially upright configuration of opposed sides 38 and back 36 may be provided. For example, the edges of opposed sides 38 and back 36 may include cooperating cylindrical barrel structures (not shown), which mesh on adjoining edges of a side 38 and back 36 and which are secured by a pin or clip (not shown). Alternatively, a cable, chain, or elastic band (not shown) may be attached to one of back 36 or side 38, adapted to be secured to a tie-down fitting or eye-bolt (not shown) on the other of back 36 or side 38 by a pin, clip, hook, or link (not shown).

Still further, angled edge clips (not shown) may be provided, the edge clips being configured to secure adjoining top edges of a side 38 and back 36 one to the other. Still yet further, an edge of opposed sides 38 may include or have attached thereto channels or recesses (not shown) configured to receive adjoining edges of back 38 therein. The user then need only raise back 36 to the upright position, and then raise edges 38 to the upright position whereby the edge of back 36 fits into an adjoining channel in or on side 38. Of course, the reverse configuration is contemplated, that is, opposed edges of back 36 may include or have attached thereto channels or recesses (not shown) configured to receive adjoining edges of opposed sides 38 therein. Any such mechanisms and other mechanisms for securing panel edges one to another may be suitable, and are contemplated for use herein.

In summary, numerous benefits are provided by the described hidden storage box 12. As should be appreciated, additional storage is afforded the user of the motor vehicle 10, without occupying existing cargo space in the vehicle cargo area. When not deployed, the hidden storage box 12 does not alter the appearance of the motor vehicle 10, unlike a conventional rear hitch-mounted apparatus or conventional storage boxes for installing in the vehicle cargo area. Thus, a convenient, useful, and attractive feature is added for the motor vehicle 10 user.

The foregoing disclosure has been presented for purposes of illustration and description. It is not intended to be exhaustive or to limit the embodiments to the precise form disclosed. Obvious modifications and variations are possible in light of the above teachings, and all such modifications and variations are within the scope of the appended claims when interpreted in accordance with the breadth to which they are fairly, legally and equitably entitled.

What is claimed:

1. A storage box system for a motor vehicle, comprising:
   a folding storage box; and
   a sliding rail assembly for translating the folding storage box between a hidden storage position below a cargo bay of the motor vehicle and a deployed position extending from a rear portion of the motor vehicle,
   whereby the folding storage box does not occupy any existing cargo space of the motor vehicle in the hidden storage position and the deployed position.

2. The storage box system of claim 1, wherein the storage box includes at least a back, opposed sides, and a floor, the back and opposed sides being hingedly connected to the floor for transitioning between a folded configuration and an unfolded configuration.

3. The storage box system of claim 2, including structures for retaining the opposed sides and back in a substantially perpendicular orientation relative to a plane defined by the floor when the folding storage box is in the unfolded configuration.

4. The storage box system of claim 3, wherein the structures are locking hinges associated with at least the opposed sides.

5. The storage box system of claim 1, wherein the sliding rail assembly includes one or more sliding rails associated with the folding storage box floor and one or more cooperating sleeves disposed below the cargo bay for slidingly receiving the sliding rails therein.

6. The storage box system of claim 5, wherein the one or more cooperating sleeves are associated with a portion of a frame of the motor vehicle disposed below the cargo bay.

7. A motor vehicle including the storage box system of claim 1.

8. A method for providing a supplemental storage compartment for a motor vehicle, comprising:
   providing a folding storage box attached to a sliding rail assembly; and
   by the sliding rail assembly, translating the folding storage box between a hidden storage position disposed below a cargo bay of the motor vehicle such that the folding storage box does not occupy any existing cargo space of the motor vehicle and a deployed position extending from a rear portion of the motor vehicle.

9. The method of claim 8, including providing a storage box having at least a back, opposed sides, and a floor, the back and opposed sides being hingedly connected to the floor for transitioning between a folded configuration and an unfolded configuration.

10. The method of claim 9, including providing structures for retaining the opposed sides and back in a substantially perpendicular orientation relative to a plane defined by the floor when the folding storage box is in the unfolded configuration.

11. The method of claim 10, wherein the structures are locking hinges associated with at least the opposed sides.

12. The method of claim 8, including providing the sliding rail assembly having one or more sliding rails associated with the folding storage box floor and one or more cooperating sleeves disposed below the cargo bay for slidingly receiving the sliding rails therein.

13. The method of claim 12, including providing the one or more cooperating sleeves associated with a portion of a frame of the motor vehicle disposed below the cargo bay.

14. A storage box system for a motor vehicle, comprising a folding storage box displaceable from a hidden storage position wherein the folding storage box is in a contracted configuration below a cargo bay of the motor vehicle end and a deployed position wherein the folding storage box is in an erected configuration forming a storage box outboard of the cargo bay, whereby the folding storage box does not occupy any existing cargo space of the motor vehicle in either the contracted configuration or the erected configuration.

15. The system of claim 14, wherein the cargo bay includes a bed accessed by means of a tailgate.

16. The system of claim 15, wherein the folding storage box in the erected configuration is adjacent to the tailgate.

* * * * *